United States Patent

[11] 3,612,973

| [72] | Inventor | Masateru Kuniyoshi<br>Yokohama-shi, Japan |
| [21] | Appl. No. | 885,636 |
| [22] | Filed | Dec. 16, 1969 |
| [45] | Patented | Oct. 12, 1971 |
| [73] | Assignee | Tokyo Shibaura Electric Co., Ltd.<br>Kawasaki, Japan |
| [32] | Priority | Dec. 20, 1968, Feb. 24, 1969 |
| [33] | | Japan |
| [31] | | 43-93114 and 44-13166 |

[54] A BRUSHLESS DC MOTOR SYSTEM COMBINED WITH A THYRISTOR BRIDGE INVERTER
7 Claims, 8 Drawing Figs.

[52] U.S. Cl. ................................... 318/254, 321/45, 318/138
[51] Int. Cl. .................................................. H02k 29/00
[50] Field of Search ........................................ 318/138, 254, 227, 231; 321/45 C

[56] References Cited
UNITED STATES PATENTS

| 3,340,453 | 9/1967 | Bradley et al. | 321/45 C |
| 3,392,318 | 7/1968 | Huntzinger | 321/45 |
| 3,395,328 | 7/1968 | Huntzinger et al. | 321/45 |
| 3,398,350 | 8/1968 | Ruff | 318/138 X |
| 3,406,328 | 10/1968 | Studtmann | 318/138 X |
| 3,419,782 | 12/1968 | Sheldrake et al. | 318/254 X |
| 3,483,458 | 12/1969 | Kirk | 318/254 X |

*Primary Examiner*—G. R. Simmons
*Attorney*—George B. Oujevolk

ABSTRACT: A polyphase thyristor bridge inverter wherein, to energize the polyphase armature winding of an electric motor, the thyristor bridge is subjected to either natural or forced commutation, the latter being effected more reliably than the former, the thyristor is safely operated under a rated load or a heavier load required, for example, in starting the motor, and the forced commutation is preferably used for such heavier load to eliminate the wasteful motion of the inverter.

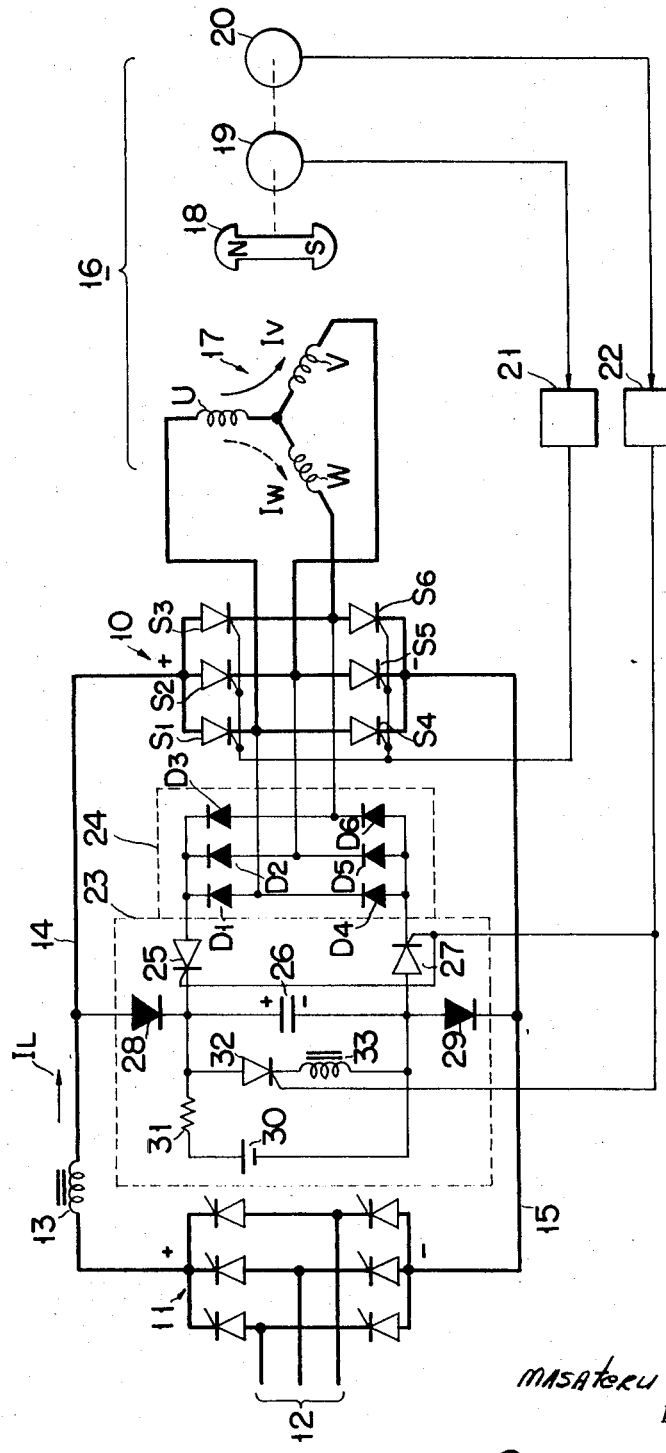

FIG. 2A
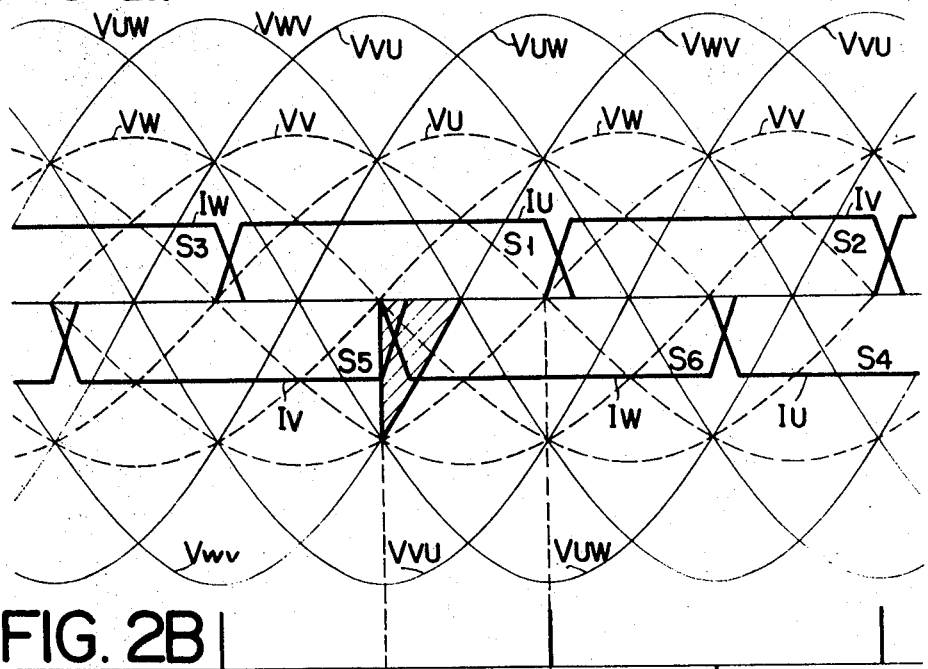
FIG. 2B
FIG. 2C
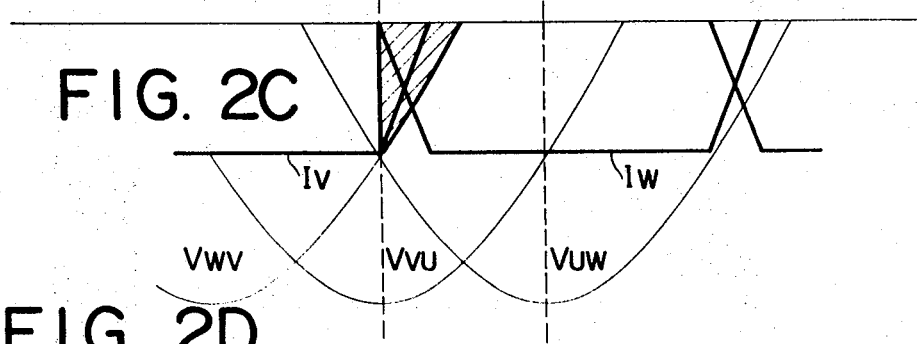
FIG. 2D
FIG. 2E
FIG. 2F

A BRUSHLESS DC MOTOR SYSTEM COMBINED WITH A THYRISTOR BRIDGE INVERTER

The present invention relates to a brushless DC motor and particularly to an improved thyristor inverter to be utilized as a static switch instead of a mechanical commutator for the motor.

Recently, various types of brushless DC motors have been developed because of their specific advantages, for example, easier maintenance because it is unnecessary to employ brushes and a commutator and having higher reliability of thyristors which are used instead of the brushes and commutators. There is however one important problem that has to be solved in this technical field of brushless DC motors. This is the commutation for a polyphase thyristor switch or an inverter which acts to force the polyphase windings, arranged along the polyphase belts of the stator core in a predetermined sequence from a DC electric power source.

As is well known, there are two representative commutation methods, one of which is a natural commutation and the other a forced one. The natural commutation utilizes an induced voltage of a winding during the rotation of the motor, and has the advantage of operating without a separate commutating device. However, in natural commutation, there is an inherent disadvantage, namely that it may fail to satisfactorily furnish the commutations when the motor is started from a standstill, as well as when undergoing heavy load conditions. On the other hand, where the forced commutation is done with a polyphase inverter, it is necessary to provide a commutating capacitor unit combined within a commutating circuit. The forced commutation circuit functions to absorb the commutation energy stored in the winding of the motor by the lagging current, and then discharges the stored charges to inversely bias the thyristor to be turned off. It is well known that the larger the load current which is applied to the motor, the greater is the capacitance that each commutation unit should have. Of course, the capacitance must be chosen at a larger value than that of the motor when started, so as to prevent the failure of the commutations due to heavy currents which may occur during the start of the motor. In general, the motor current needed is usually relatively small in amplitude, or rated values during normal running operation whereas relatively much larger currents are required when starting and when under heavier load conditions. As a result of this, the force commutation circuit should usually be provided with a capacitor having a substantially larger capacitance. This causes the brushless motor to be larger in size and more expensive.

It is therefore an object of this invention to provide a brushless DC motor in which the aforesaid two different types of commutation are effectively combined and the disadvantages in both systems are effectively eliminated.

In accordance with this invention, there is provided a bridge inverter including a plurality of thyristors and energized from a variable DC voltage source to convert the DC variable voltages to AC variable voltages. There is also provided electric motor means comprising polyphase windings having inputs respectively connected to the corresponding polyphase outputs of the inverter and wound on a stator core, a rotor magnetically combined with the stator core and having DC exciting means and means for detecting the angular positions of the rotatable rotor to generate successive gate control signals for said inverter. The inverter includes a forced commutation for the inverter at an angle which lags with respect to the commutation angles of natural commutations.

The invention can be fully understood from the following description with reference to the appended drawings, in which:

FIG. 1 shows a schematic diagram of an embodiment according to the invention;

FIG. 2A shows waveforms which include main thyristor currents, phase voltages and interphase voltages in a three-thyristor bridge inverter;

FIG. 2B shows successive gate pulses for each of the main thyristors in the thyristor bridge inverter;

Figure 3:
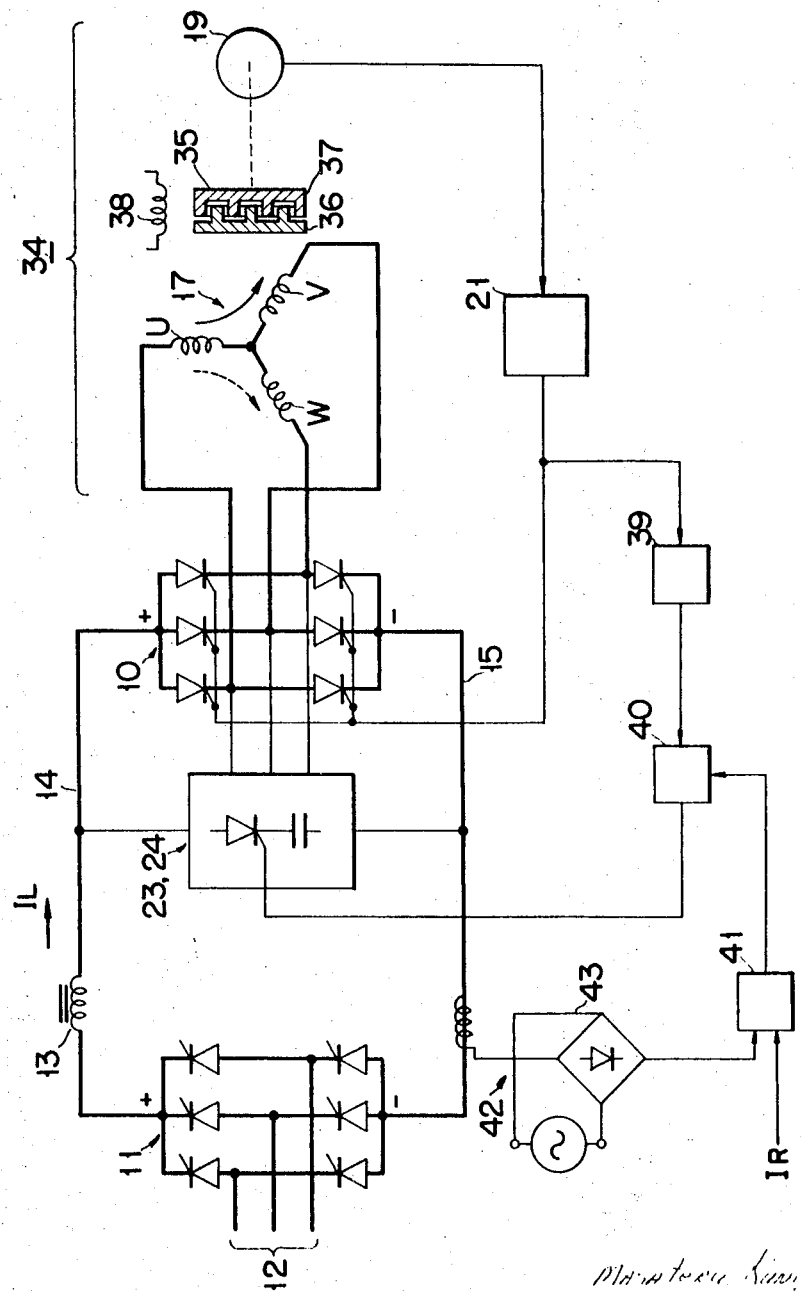

FIG. 2C shown a part of similar waveforms under heavier load condition than those of FIG. 2A;

FIGS. 2D, 2E and 2F show gate pulses for auxiliary thyristors which are respectively utilized in a forced commutation device according to the present invention; FIG. 2E represents output voltage waveforms of a three-phase full wave inverter which at a certain time corresponds to FIGS. 2A, 2B, 2C and 2D; FIG. 2F shows output current waveforms of the inverter which similarly correspond to FIGS. 2A, 2B, 2C and 2D at another time, and FIG. 3 shows a schematic diagram of another embodiment according to the invention.

Referring now to FIG. 1, there is generally shown a three-phase inverter 10 having six main thyristors S1, S2, S3, S4, S5 and S6 connected in bridge arms, respectively, as shown. It should be understood, however, that the number of main thyristors to be employed in each bridge arm is defined by the maximum voltage amplitudes and/or the maximum current amplitudes which may be added to the inverter circuit. To force the three-phase bridge inverter with variable DC voltages, there is provided a three-phase bridge rectifier 11 comprising six thyristors connected in a three-phase full wave rectifying manner. Of course, each element of the thyristors connected in each of the bridge arms of the rectifier may be formed with series or parallel thyristor stacks responsive to the voltage amplitudes and/or current amplitudes to be handled. The AC inputs of the rectifier bridge 11 are connected through three conductors 12 to a three-phase AC voltage source having a relatively constant voltage value. The positive output of the rectifier is connected through a smoothing reactor 13 and a conductor 14 to the positive input of the inverter and the negative output of the rectifier is similarly connected through a conductor 15 to the negative input of the inverter.

An electric motor is generally shown by reference numeral 16, which comprises a stationary polyphase armature winding or a star-connected three-phase winding 17, a permanent-magnet-type rotor 18 and a pair of position detectors or rotation angle position-detectors 19 and 20 which are mounted on an extension of the rotor shaft. For convenience in description, the armature winding has been shown with star-connection, however it may be delta-connection if desired, and the number of motor phases correspond to those of the inverter. It would be also easily understood that though there has been a permanent-magnet-type rotor, it may be altered by a comb-shaped, sole-type, or a clutch-type rotor having at least one of stationary exciting coils associated therewith. The angular position detector 19 and 20 has a conventional construction, for example it may be a rotatably inductive-type pulse generator, and generates sequential electric pulses in response to the angular positions of the rotor during its rotation.

Though the reason will be soon clarified, there is a predetermined phase difference between each of the pulses generated by the angular position-detector 19 and each of the pulses generated by the detector 20.

The output pulse trains of the angular position detector 19 are fed to a gate control 21 which in turn supplies gating pulses in a predetermined sequence with the gate electrodes of the main thyristors in the bridge 10, respectively. On the other hand, there is provided a separate gate control 22 for a purpose that will be soon clarified and it is supplied with pulse train generated from the position detector 20.

Where natural commutation for bridge inverter 10 is required, both gate control 22 and a forced commutation device generally denoted by reference numeral 23 can be eliminated. In accordance with the invention, however, these gate control and forced commutation device are both necessary for the following reason.

The forced commutation device 20 comprises a three-phase rectifying bridge circuit 24 which includes six diodes D1, D2, D3, D4, D5 and D6 connected in a three-phase full wave rectifying bridge. Each AC input of the bridge arms is connected to each AC output of the main thyristor bridge arms, respectively, as shown. There are also provided electrical connections between each phase arm of the thyristor bridge 10 and the input terminal of each phase winding of the electric motor 16. For convenience in description, it is contemplated that the phase windings of the motor are named as U-phase winding, V-phase one and W-phase one, respectively, and these windings are located at angular positions which are shifted away from each other by an electrical angle of 120°. The positive output of the diode bridge 24 is passed through an auxiliary thyristor 25 in its forward direction to one terminal of capacitor 26, and whereas the negative output of the same is connected to the other terminal of the capacitor through another auxiliary thyristor 27 in the forward direction. Both auxiliary thyristors 25 and 27 are controlled by gate control 22.

For simplifying the illustration, the drawings show only one of the conductors which connect the gate electrodes of the thyristors and the gate controls 21 and 22. But in practice of course there are provided a plurality of independent controlling conductors for the thyristors respectively.

A diode 28 having a polarity as shown connects the one terminal of the capacitor 26 and the positive input of the inverter 10, and similarly the other terminal of the capacitor is connected to the negative input of the inverter through another diode 29 having a conductive polarity as shown. Thus the capacitor 26 will be charged from the inverter inputs in a charged polarity as shown through the two diodes 28 and 29. However, the input voltage level for the inverter may be varied to make the motor speeds vary, and consequently the amplitudes of the charged voltages across the capacitor may be reduced to an extent insufficient to achieve the forced commutation as described hereinafter. To overcome this defect, there is provided an auxiliary DC voltage source 30 to give the minimum ensured charged voltages for the commutation capacitor through a series resistor 31 having a relatively high resistance value. According to an object described hereinafter, there is provided a series combination of an auxiliary thyristor 32 and a reactor 33.

In operation, it is assumed that the inverter 10 generates a three-phase AC output voltage at the outputs thereof, whereby the three-phase winding 17 of the motor 16 is forced by the inverter output to rotate the rotor 18 which is made of a permanent magnet in a direction in accordance with a predetermined sequence of phase rotation in the aforesaid stationary winding 17. The six main thyristors S1 to S6 in the bridge inverter 10 are sequentially turned on with the aforesaid order due to the gating pulses through the gate control 21 which is given the controlled pulses from the angular position-detector 19. It can be easily understood that the motor speeds may be variable by varying the output voltages of the inverter whose input voltages, that is, the output voltages of bridge rectifier 11, are controlled by controlling the firing phases to the thyristor gates in the prescribed rectifier bridge 11.

The natural commutation of the bridge inverter 10 will first be given by reference to the various waveforms, as shown in FIG. 2.

FIG. 2A shows the interrelations among the phase voltages $Vu$, $Vv$ and $VW$ and interphase voltages $Vuv$, $Vvw$ and $Vwu$, as well as preferred conductive currents in the main thyristors S1 and S6, respectively, in an AC three-phase circuit. FIG. 2B shows gating pulses for each of main thyristors to make them turn on or switch on in turn. It can be seen that the gating pulses as shown in FIG. 2B are supplied from an angular position detector 19 through gate control 21, and the same pulses are generated at a time when adjacent phase voltages become substantially equal, respectively, In the following description, the prescribed time may be referred to as a commutation point or time.

It is assumed now, that where a current $Iv$ as shown with a solid arrow line flows through windings in U and V phases of the stator winding 17 for the motor 16, it is required to transfer the current from the prescribed phases to U and W phases so as to flow through them. In the former case, the main thyristors S1 and S5 are both in conduction. Therefore, there is required to make the main thyristor S6 turn on. To this end, a gating pulse as shown in FIG. 2B is supplied to the gate of the thyristor S6 to be next conductive at a time $t_1$ which corresponds to a point of equal amplitudes of the interphase voltages $Vuw$ and $Vwv$, as well as zero level of the phase voltage $Vw$. Thus, at the time $t_1$ a so-called commutation will be begun in such a manner that $Iv$ gradually decreases whereas $Iw$ gradually increases. When this occurs, the commutation voltage consisting of a part of the interphase voltage $Vwv$ which is also shown by an area formed of oblique lines, causes the thyristor 85 to inversely bias through the thyristor S6 against its conductive direction, thereby the conduction as well as the carriers of the thyristor S5 will be rapidly eliminated. Therefore the current $Iv$ shown by a solid arrow line becomes zero whereas the other $Iw$ shown by a dashed arrow line, increases to a predetermine amplitude to be defined by the DC source voltages, the motor impedance and the impedances of other parts in the circuit. As is clear in FIG. 2A, the amplitudes of the commutation voltages in the natural commutation are defined by the amplitudes of the interphase voltages as shown with an area with oblique lines. Accordingly, the amplitudes of the commutation voltages have substantially constant values when the interphase voltages are substantially constant.

Thus, if there are no heavier increases in the load currents of the motor at a relatively constant source voltage, the inverter 10 will satisfactorily perform its function without any failure of the commutation and a successive commutation will occur between the currents $Iu$ and $Iv$ by giving a gate pulse for thyristor S2 at a time $t_2$, then the $Iu$ flowing through thyristor S1 becomes reduced to zero value whereas the $Iv$ flowing through thyristor S2 will increase the aforesaid predetermine amplitude, as shown in FIGS. 2A and 2B.

As pointed out thereinbefore, there is a difficulty introduced during the natural commutation for the inverter. That is, where the DC input voltages for the inverter will be held at a relatively constant value, then the output AC voltages of the same will be also held at a similarly relative constant amplitude, and it is assumed that the heavier load currents will be supplied to the load or motor 16 in response to the sudden increases of the load thereof. Such a load condition is shown in FIG. 2C. It can be easily understood due to the aforesaid teaching that the commutation voltages, when the commutation is effected from phase V to the phase W, will have a relatively constant amplitude because of the unchanged AC voltage of the inverter. This commutation voltage is shown with an area formed of oblique lines substantially equal to that of FIG. 2A.

It can be seen in FIG. 2C when compared with FIG. 2A that the overlap angles between the successive commutation currents during the commutation period of time will increase as the amplitudes of the load currents become larger. Because the interphase voltages which are effective for the commutation have relatively constant values so long as the AC input voltages for the inverter are relatively constant, the natural commutation will become insufficient to effectively make the preconducted thyristor turn off, and consequently there may be a failure of commutation, which may result in the short circuiting in the inverter circuit. Thus the natural commutation-type inverter will result in the inconvenience accompanying the failures of the commutations when it is under the heavier current conditions that may occur during the motor starting or the heavy load conditions of the same.

In accordance with the present invention, the prescribed defects may be effectively eliminated by adding a simple forced-commutation device 23 to the prescribed natural commutation circuit, and the arrangements for the components of the forced commutation device have been already disclosed.

A capacitor unit 26 is normally charged through diodes 28 and 29 connected in series therewith by the DC voltages across the DC input for the inverter 10.

The consideration is made for a heavier load condition as shown in FIG. 2C. As mentioned above, the natural commutation angle for the inverter 10 depends upon the pulses generated from the position detector 19, and takes an angle suited for a normal running operation of the motor 16 within a usual load range, which, of course, is in the time interval from the time $t_1$ to the time at which the interphase voltage Vwv becomes zero as is shown in FIGS. 2A and 2C.

When a heavier load condition occurs, it becomes difficult to commutate to successively conduct the main thyristors because the amplitude of the current flowing through the thyristor which is turned on shows a relatively higher value and its turnoff time will be so elongated responsive to the higher amplitudes of the currents that the turnoff time will occur behind the zero point of the interphase voltage, and thereby the commutation failure will occur. However, the second position detector 20 will supply the separate angular position signals (FIG. 2E) preferably before reaching the zero point of the interphase voltages to the second gate control 22.

Assuming now that the commutation is made from V phase current Iv to W phase one Iw as shown in FIG. 2C, that is, from the main thyristor S5 to S6 in FIG. 1, and firstly one of the gating pulses generated from the gate control 22 is supplied to a gate electrode of an auxiliary thyristor 32 to make it turn on. As a result of this, the charges stored in the capacitor 26 which have charged polarity as shown will discharge through an oscillating circuit which includes the capacitor 26, thyristor 32 and a reactor 33 in a series circuit relation. Due to the function of this oscillating circuit, the polarity of the capacitor 26 will finally become inverse with respect to the one shown. As a result, the thyristor 32 is turned off with the inverse bias due to the inverted capacitor voltages. The next gating pulse similarly generated from the gate control 22 comes to a gate electrode of a separate auxiliary thyristor 25, and thus the thyristor 25 will be turned on. The charged voltage will be added across the thyristor S5 in the reverse direction through diode 29, thyristor S5, diode D2 and thyristor 25 so that the current flowing through the thyristor will be reduced to zero value and the thyristor S5 will be deeply biased in the reverse direction and turned off. The aforesaid inverse bias circuit including the capacitor 26 will also absorb the larger commutation energy involved within the V-phase winding of the stator winding 17 of the motor, and after the prescribed absorptions the thyristor S5 is turned off. It will be easily understood that the prescribed absorption of the commutation energy will be achieved with a capacitor having a relatively small capacitance because the charged polarity of the capacitor and the polarity of the self-induction voltages of the V-phase winding take the inverse directions with each other.

On the other hand, there has been provided a gate pulse (FIG. 2D) for the gate electrode of the thyristor S6 so as to make the same turn on. Thus, the commutation from thyristor S5 to S6 has been completed under the heavier load conditions.

The commutation from the thyristor S1 and S2 will be made in a similar manner to that mentioned above. In this case, the capacitor 26 is charged from the DC voltage source in the same polarity as in the aforesaid case, and the auxiliary thyristor 32 are firstly turned on with a gate pulse which is generated from the position detector 20 through the gate control 22 to cause the charged polarity of the capacitor 26 to reverse with respect to that as shown. Then the thyristor 27 is turned on with a gate pulse which is generated from the position detector 20 through the gate control 22. The charged voltages on the capacitor 26 will be added across the thyristor S1 in the inverse direction through the thyristor 27, a diode D4, thyristor S1 and a diode 28, thereby the current flowing through the thyristor S1 will be reduced to zero value, besides the thyristor S1 will be deeply biased in reverse polarity and then turned off soon. Further, because a gating pulse, which is generated from the position detector 19 through the gate control 21, is added to the gate electrode of the thyristor S2 to make the same turn on, the inverter currents will be transferred from the thyristor S1 to S2, because the turn off of the thyristors 25 and 32 will be similarly made as mentioned above, so that the further explanation thereof is omitted.

As pointed out hereinbefore, to run the motor with variable speeds the DC output voltages of the bridge rectifier 11 will be adjusted by means of a gate control thereof (not shown) causing the DC input voltages for the bridge inverter 10 to vary, and thereby the AC output voltages of the same are adjusted so as to energize the stator winding 17 with variable AC voltages. Consequently, in the case that the adjusted DC voltages for the inverter 10 are reduced to a predetermined lower value, it is impossible to effectively provide the forced commutation energies sufficient for the inverter 10, causing the failures of commutation of the inverter when the load currents thereof become relatively larger.

In accordance with the embodiment shown in FIG. 1, however, there is provided a separate DC source 30 having output terminals connected across the capacitor 26 through a resistor 31 having a relatively high resistance value as mentioned above. The DC voltage source 30 will ensure to hold a minimum voltage on the capacitor sufficient to cause the inverter to effectively commutate when the DC voltage values from the bridge rectifier 11 fall down to amplitudes insufficient to give the commutation voltage levels for the capacitor 26.

As pointed out hereinbefore, because the resistor 31 has a relatively high resistance value, the interferences between the charged voltages on the capacitor 26 due to the outputs of the bridge rectifier 11 and the voltages of the separate DC voltage source 30, in which the former is usually higher than the latter, will not occur.

FIG. 2D shows gate pulses for the auxiliary thyristor 32, given from the gate control 22 and generated at every time of commutations for the main thyristors S1 and S6. FIG. 2E also shows gate pulses for the auxiliary thyristor 25, and FIG. 2F shows the ones for the similar auxiliary thyristor 27, supplied from the gate control 22 timed to correspond to FIGS. 2A, 2B and 2C, respectively.

With the disclosed teaching, there are various kinds of ways to use the electric motor, for example, for paper machine systems to be driven with a relatively constant speed, for the rolling mills which are driven with variable speeds and for electric coaches also being driven at variable speeds. It may be necessary to take the regenerative brakes for the motors in some cases such as the mill motors and the motors for electric coaches, thereby reducing their speeds upon the reversible running or the suppressing of the speeds therefor.

Briefly speaking, in the latter case there will occur some conversions of the operations in the apparatus shown in FIG. 1, that is, the bridge inverter 10 will be converted into the bridge rectifier and generates DC outputs having an inverse polarity with respect to the polarity shown, whereas the bridge rectifier 11 is converted into a bridge inverter having an inverse DC polarity at its DC input with respect to the one as shown, It can be seen that the inverse currents contemplating to inversely flow through the forced commutation device 23 are effectively obstructed by means of diodes 28 and 29. These conversions may be made by any suitable control arranged for this purpose, but since the constructions and functions of the converted inverter and rectifier are well known in the art, detailed description may be omitted herein.

Though the disclosed embodiment has been featured by the facts that cause the capacitance of the capacitor 26 in the forced commutation circuit 23 to minimize and result in a satisfactory commutation even under the heavier load conditions of the electric motor 16, the forced commutation will occur when the motor undergoes a light load condition. In the latter case, the commutations in the inverter are generally effected by means of the natural commutation rather than the forced one. Therefore, in this case, the forced commutation device 23 will make only the wasteful lost motion accompanying with a wasteful consumption of an electric power.

Another embodiment shown in FIG. 3 will dissolve the prescribed defect, in which the similar parts to those shown in FIG. 1 are denoted by the same reference numerals so that the detailed explanation thereof is omitted.

For simplifying the illustration, the forced commutation device 23 with the diode bridge 24 is shown as only one block in FIG. 3. Besides, electric motor 34 has little difference with respect to that shown in FIG. 1 in the fact that it includes comb-shaped or pole-type rotor members 36 and at least tone DC exciting coil 38 for the rotor located on the stationary side of the motor, in which the rotor comprises a pair of rotor members 36 and 37 having a plurality of comb-shaped poles which are mechanically engaged with each other in an axial direction of the motor. The motor 34 also has only one position-detector 19 which is compared with that shown in FIG. 1.

The electrical signals from the detector 19 which represent the sequential angular positions of the rotor 35 are supplied to the gate control 21. In this embodiment, it has only one gate control 21 which is compared with that disclosed in the embodiment of FIG. 1. On one hand, the output gate pulses are directly fed to each of the main thyristors in the bridge inverter 10 so as to make the thyristors to turn on in turn as described in FIG. 1.

On the other hand, the output gate pulses from the gate control 21 are fed to a phase-shifter circuit 39 where they are lagged by the aforesaid angle from the natural commutation angle for the main thyristors in the bridge inverter 10. The output pulses lagged in the phase thereof from the phase-shifter 39 are fed through an AND gate 40 to the auxiliary thyristors as shown in FIG. 1 in the forced commutation circuit 23. The AND gate is also supplied with a signal from a comparator 41 which generates the aforesaid signal where the amplitudes $I_L$ of the load currents to be fed from the rectifier 11 to the inverter 10 exceed a predetermined amplitudes $I_R$ which is obtained from any suitable DC reference voltage source (not shown). The input signals responsive to the load currents $I_L$ and to be compared with the reference $I_R$ are fed to the input of the comparator from a conventional DC current transformer unit 42 which comprises a secondary coil or an inductance coil linked with the conductor 15 connected between with one of the output terminals of the rectifier 11 and corresponding one of the input terminals of the inverter 10, a relatively constant AC voltage source in order to energize the prescribed inductance coil and a rectifier 43 for supplying DC signals to be compared for the comparator due to rectifying the AC currents flowing through the inductance coil and having amplitudes proportional to said load currents.

It can be easily understood from this embodiment that only where the amplitudes of the load currents to be fed from the rectifier to the inverter will exceed a predetermined amplitude which is defined by a reference, the forced commutation circuit 23 will function to positively turn off the main thyristor which must be turned off. Accordingly, the wasteful use of the forced commutation circuit which may occur in light load conditions can be effectively eliminated.

As described above, according to this invention, there can be provided new brushless DC electric motor systems employing the bridge connected inverter without failures of commutation thereof during any light load or heavier load conditions on the motor.

What is claimed is:

1. A brushless DC motor system having a polyphase stator winding; a rotor having DC magnetic poles and located within an AC revolving field generated by said polyphase stator winding; a bridge-type polyphase thyristor inverter provided with natural commutation function and having an AC output connected to input terminals of said polyphase stator winding and a DC input connected to a DC voltage source, said inverter being composed of a plurality of main thyristor units each of which is in each arm of said bridge inverter; angular position-detecting means mounted on an axial extension of said rotor to generate electric signals in the form of an electric pulse train for representing angular positions of said rotor; and a forced commutation device connected with said bridge inverter to be controlled by said electric signals from the angular position-detecting means to effect a forced commutation for the thyristor bridge inverter at a time between the beginning time of a natural commutation of the thyristor bridge inverter and the zero level of commutating voltage.

2. A brushless DC motor system according to claim 1 in which said angular position-detecting means are composed of first and second detectors, said first detector-generating gate pulses at the beginning time of the natural commutation of said invertor, said second detector-generating control signals at the time between the beginning time of the natural commutation and the zero level of the commutating voltage.

3. A brushless DC motor system according to claim 1 in which said angular position-detecting means for the rotor consists of a single detector which generates electric signals in the form of a pulse train which includes pulses corresponding to the angular positions of the rotor, said pulses being directly fed to the gate electrodes of the main thyristor units of the inverter at the beginning time of natural commutation thereof and being fed through a phase shifter to the forced commutation device, said phase shifter causing the pulses from the angular position detector to lag by a predetermined electrical angle which is included between the beginning time of natural commutation and the zero level of the commutating voltage for the natural commutation.

4. A brushless DC motor system according to claim 3 comprising, means for detecting the amplitudes of DC input currents of the bridge inverter; a gate circuit connected between the output of the phase shifter and the input of the forced-commutation device; a comparator for receiving the outputs from said amplitude detecting means, and from a reference voltage source and generating electrical signals responsive to the differences between said outputs from the amplitude-detecting means and the reference voltage where the inputs for the inverter exceed a predetermined value; whereby when said gate circuit is simultaneously supplied with the electrical signals from the comparator and the phase shifter the function of the forced commutation device begins to start.

5. A brushless DC motor system according to claim 1 in which said forced commutation device being composed of a capacitor unit connected between the DC inputs of the bridge inverter and normally charged from the bridge inverter inputs; a first auxiliary thyristor unit having a conductive polarity to discharge the electric charges normally charged on said capacitor unit, an inductance coil connected in series with said first auxiliary thyristor unit, said inductance coil and capacitor forming an oscillation circuit when said first auxiliary thyristor unit turns on; a diode bridge having the same number of phases as those of the bridge inverter and each phase of DC inputs thereof being connected to the corresponding output phase of the inverter; a second auxiliary thyristor unit connected between one of the DC output terminals of said diode bridge and one of the terminals of said capacitor unit and having a conductive polarity so as to make the forced commutation currents for the thyristor bridge inverter flow from said one of the DC output terminals of the diode bridge to said one of the terminals of the capacitor unit; a third auxiliary thyristor unit connected between the other terminal of said capacitor unit and the other output terminal of said diode bridge and having a conductive polarity so as to make forced commutation currents for the thyristor bridge inverter flow from said other terminal of the capacitor to the other output terminal of the diode bridge; said first auxiliary thyristor becoming conductive every time when any commutation is effected between two main thyristors in the thyristor bridge, said second and third auxiliary thyristors becoming alternately conductive respectively, every time when said first auxiliary thyristor becomes conductive.

6. A brushless DC motor system according to claim in which said capacitor unit in the forced commutation device is connected through diode means between said DC inputs of the thyristor bridge inverter, said diode means permitting to conduct the charged currents for said capacitor unit where said inverter functions as the inverter itself, but not permitting to conduct the currents through the forced commutation device where said electric motor functions as regenerative generator and thereby said inverter is converted into a bridge rectifier.

7. A brushless DC motor according to claim 5 in which a separate DC voltage source for ensuring the minimum charged voltage values on said capacitor unit, where the amplitudes of the DC input voltage for said thyristor inverter fall beneath a charged voltage level on said capacitor unit insufficient to obtain the forced commutation, being connected through a resistor having a relatively high resistance value across the capacitor unit.